United States Patent
Brazas, Jr. et al.

(10) Patent No.: US 6,181,458 B1
(45) Date of Patent: Jan. 30, 2001

(54) MECHANICAL GRATING DEVICE WITH OPTICAL COATING AND METHOD OF MAKING MECHANICAL GRATING DEVICE WITH OPTICAL COATING

(75) Inventors: John C. Brazas, Jr., Hilton; Marek W. Kowarz; Brian E. Kruschwitz, both of Rochester, all of NY (US)

(73) Assignee: Eastman Kodak Company, Rochester, NY (US)

(*) Notice: Under 35 U.S.C. 154(b), the term of this patent shall be extended for 0 days.

(21) Appl. No.: 09/216,054

(22) Filed: Dec. 18, 1998

(51) Int. Cl.⁷ ................................................. G02B 26/00
(52) U.S. Cl. .................. 359/290; 359/291; 359/572; 359/573
(58) Field of Search .................................. 359/290, 291, 359/295, 572, 573, 224

(56) References Cited

U.S. PATENT DOCUMENTS

| | | | |
|---|---|---|---|
| 4,011,009 | 3/1977 | Lama et al. | 350/162 R |
| 4,492,435 | 1/1985 | Banton et al. | 350/360 |
| 4,596,992 | 6/1986 | Hornbeck | 346/76 PH |
| 5,115,344 | 5/1992 | Jaskie | 359/573 |
| 5,126,873 * | 6/1992 | Ang | 359/217 |
| 5,245,468 * | 9/1993 | Demiryont et al. | 359/359 |
| 5,311,360 | 5/1994 | Bloom et al. | 359/572 |
| 5,367,584 * | 11/1994 | Ghezzo et al. | 385/17 |
| 5,459,610 | 10/1995 | Bloom et al. | 359/572 |
| 5,661,592 | 8/1997 | Bornstein et al. | 359/291 |
| 5,661,593 | 8/1997 | Engle | 359/292 |
| 5,677,783 | 10/1997 | Bloom et al. | 359/224 |
| 5,757,536 | 5/1998 | Ricco et al. | 359/224 |
| 5,808,797 | 9/1998 | Bloom et al. | 359/572 |
| 5,949,570 * | 9/1999 | Shiono et al. | 359/291 |
| 5,999,319 * | 12/1999 | Castracane | 359/573 |
| 6,043,133 * | 3/2000 | Jang et al. | 438/401 |

OTHER PUBLICATIONS

A. E. Ennos, "Stresses Developed in Optical Film Coatings", 1966, Optical Society of America, *Applied Optics*, vol. 5(1), 51–61.

D. Maystre et al., "Gratings for tunable lasers: using multidielectric coatings to improve their efficiency", *Applied Optics*, vol. 19, No. 18, Sep. 15, 1980, pp. 3099–3102.

* cited by examiner

*Primary Examiner*—Georgia Epps
*Assistant Examiner*—Tim Thompson
(74) *Attorney, Agent, or Firm*—William F. Noval; Stephen H. Shaw (57) ABSTRACT

A mechanical grating device for enhancing the reflective properties is presented. A mechanical grating has a plurality of parallel ribbon elements which are suspended above a channel. An incident light beam is modulated by the actuation of selected ribbon elements. The actuation of the ribbon elements, which changes the height of the ribbon elements relative to the substrate, is a result of an applied voltage that produces an electrostatic force. On the top surface of the ribbon elements is a coating of reflective metal upon which is an optical coating is provided. The optical coating is a stack of at least two different materials with different refractive indices. The thickness and the composition of the sequential layers in the stack are chosen to produce certain desired reflective properties. Embodiments are presented for reducing the mechanical effects of the dielectric optical coating.

23 Claims, 9 Drawing Sheets

MECHANICAL GRATING DEVICE WITH OPTICAL COATING AND METHOD OF MAKING MECHANICAL GRATING DEVICE WITH OPTICAL COATING

CROSS REFERENCE TO RELATED APPLICATIONS

Reference is made to U.S. Ser. No. 09/216,202, filed Dec. 18, 1998, entitled "Process for Manufacturing an Electro-Mechanical Grating Device"; to U.S. Ser. No. 09/216,289, filed Dec. 18, 1998, entitled "A Mechanical Grating Device"; and to U.S. Ser. No. 09/215,973, filed Dec. 18, 1998, entitled "Method for Producing Co-Planar Surface Structures."

FIELD OF THE INVENTION

This invention relates to the field of modulation of an incident light beam by the use of a mechanical grating device. More particularly, this invention discloses a mechanical grating device which has a significant improvement in the output of the diffracted light beam by the use of an optical coating. Furthermore the invention relates to a method of making a mechanical grating device with an optical coating.

BACKGROUND OF THE INVENTION

Mechanical or electromechanical spatial light modulators have been designed for a variety of applications, including image processing, display, optical computing, and printing. Optical beam processing for printing with deformable mirrors has been described by L. J. Hornbeck; see U.S. Pat. No. 4,596,992, issued Jun. 24, 1984, entitled "Linear Spatial Light Modulator and Printer". A device for optical beam modulation using cantilever mechanical beams has also been disclosed; see U.S. Pat. No. 4,492,435, issued Jan. 8, 1985, to M. E. Banton entitled "Multiple Array Full Width Electromechanical Modulator," and U.S. Pat. No. 5,661,593, issued Aug. 26, 1997 to C. D. Engle, entitled "Linear Electrostatic Modulator." Other applications of electromechanical gratings include wavelength division multiplexing and spectrometers; see U.S. Pat. No. 5,757,536, issued May 26, 1998 to A. J. Ricco et al., entitled "Electrically Programmable Diffraction Grating,".

Electro-mechanical gratings are well known in patent literature; see U.S. Pat. No. 4,011,009, issued Mar. 8, 1977 to W. L. Lama et al., entitled "Reflection Diffraction Grating Having a Controllable Blaze Angle," and U.S. Pat. No. 5,115,344, issued May 19, 1992 to J. E. Jaskie, entitled "Tunable Diffraction Grating". More recently, Bloom et al. described an apparatus and method of fabrication for a device for optical beam modulation, known to one skilled in the art as a grating-light valve (GLV); see U.S. Pat. No. 5,311,360, issued May 10, 1994, entitled "Method and Apparatus for Modulating a Light Beam". This device was later described by Bloom et al. with changes in the structure that included: 1) patterned raised areas beneath the ribbons to minimize contact area to obviate section between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces. See U.S. Pat. No. 5,459,610, issued Oct. 17, 1995, entitled "Deformable Grating Apparatus for Modulating a Light Beam and Including Means for Obviating Stiction Between Grating Elements and Underlying Substrate", and U.S. Pat. No. 5,808,797, issued Sep. 15, 1998, entitled "Method and Apparatus for Modulating a Light Beam". Bloom et al. also presented a method for fabricating the device; see U.S. Pat. No. 5,677,783, issued Oct. 14, 1997, entitled "Method of Making a Deformable Grating Apparatus for Modulating a Light Beam and Including Means for Obviating Stiction Between Grating Elements and Underlying Substrate".

In all embodiments of the mechanical grating device or the Grating Light Valve device (GLV) in the aforementioned patent literature, a single metallic, reflective coating with a bare upper surface has been added to the top surface of the ribbons to apply the electrostatic force required for actuation, and also to increase the efficiency of diffraction of the device by increasing the reflectivity. In high-power applications, the reflective coating also results in longer lifetime of the GLV device. A high reflectivity is important to reduce damage of the top surface of the ribbons and avoid mechanical effects that might be attributed to a significant increase in the temperature of the device due to light absorption.

A method for fabricating another embodiment of the GLV device was presented by Bornstein et al.; see U.S. Pat. No. 5,661,592, issued Aug. 26, 1997, entitled "Method of Making and an Apparatus for a Flat Diffraction Grating Light Valve". In this embodiment, a thin (<500 Å) dielectric layer is formed over the reflecting metallic layer on the top surface of the ribbons.

Dielectric multilayer coatings have been used on static metallic diffraction gratings to enhance diffraction efficiency and reduce absorption in the metal. D. Maystre et al. presented studies of two-layer and four-layer coatings on aluminum gratings in "Gratings for tunable lasers: using multi-dielectric coatings to improve their efficiency," published in *Applied Optics,* vol. 19 (1980).

The prior art does not mention the problem of the effects of the optical coating on the mechanical properties of the ribbon elements.

SUMMARY OF THE INVENTION

It is an object of the present invention to provide a mechanical grating device which shows an increased the reflectivity at the wavelength of interest. Furthermore, the absorption of light is reduced, resulting in a longer lifetime of the mechanical grating device. It is also an object of the present invention to provide a mechanical grating device that diffracts light into the +1 and −1 orders in the unactuated state and reflects light into the 0 order in the actuated state.

The object is achieved by a mechanical grating device comprising:

a base having a surface;

a spacer layer provided above the base, said spacer layer defining an upper surface and a longitudinal channel defining a width is formed in said spacer layer;

a plurality of spaced apart deformable ribbon elements disposed parallel to each other and spanning the width of the channel, said deformable ribbon elements defining a top and a bottom surface;

a reflective layer added to the top surface of each of said ribbon elements; and an optical coating provided on top of the reflective layer of every other ribbon element.

The above object is also achieved by a mechanical grating device comprising:

a base having a surface;

a spacer layer provided above the base, said spacer layer defining an upper surface and a longitudinal channel defining a width is formed in said spacer layer;

a plurality of spaced apart deformable ribbon elements disposed parallel to each other and spanning the width of the channel, said deformable ribbon elements defining a top and a bottom surface;

a reflective layer added to the top surface of each of said ribbon elements; and an optical coating provided on top of the reflective layer of every ribbon element wherein the optical coating is formed as a stack of more than one transparent dielectric layers.

It is a further object to provide a method of making a mechanical grating device, which shows an increased reflectivity at the wavelength of interest; furthermore, the absorption of light is reduced, resulting in a longer lifetime of the mechanical grating device.

The above object is accomplished by a method comprising the steps of:

providing a spacer layer on top of a protective layer which covers a substrate;

etching a channel entirely through the spacer layer;

depositing a sacrificial layer at least as thick as the spacer layer;

rendering the deposited sacrificial layer optically coplanar by chemical mechanical polishing;

providing a tensile ribbon layer completely covering the area of the channel;

providing a reflective layer;

providing an optical coating;

patterning the optical coating, the reflective layer, and the ribbon layer in the form of a grating; and removing entirely the sacrificial layer from the channel.

It is advantageous that the inventive mechanical grating device can be used for printing on photosensitive media. The efficiency is maximized to allow faster rates of printing while reducing the power requirements of the optical sources providing the incident illumination. For display and other applications, increased efficiency is also advantageous. Further, for application of the device to laser thermal printing, the absorption of light in the metal reflector layer is minimized.

In this invention, a plurality of layers comprising at least two different dielectric materials are formed on the metallic surface of an electro-mechanical grating device to serve as an optical coating. In one embodiment, the optical coating may also be a single metal layer which is provided on every other ribbon element of the mechanical grating device. The thickness of this single metal layer is selected to result in a diffraction of the incident beam when the mechanical grating device is not actuated. In the other embodiments the primary purpose of the optical coating (transparent) is to alter the reflective properties of the metallic surface (reflective layer). The effects achieved by the use of the optical coating are an increase in the reflectivity at the wavelength of interest, a reduction in the absorption of light by the ribbon elements, or an alteration of the phase shift incurred by reflection of light by the ribbon elements. In order to reduce the effects on the mechanical properties of the ribbon elements caused by the presence of the optical coating, two techniques can be used, either separately or in tandem. First, the use of stress compensation by choosing for the optical coating two oppositely stressed dielectric materials. Secondly, a new embodiment in which the optical coating material is localized to the center region of the ribbon elements.

BRIEF DESCRIPTION OF THE DRAWINGS

The subject matter of the invention is described with reference to the embodiments shown in the drawing.

DETAILED DESCRIPTION OF THE INVENTION

Figure 1:
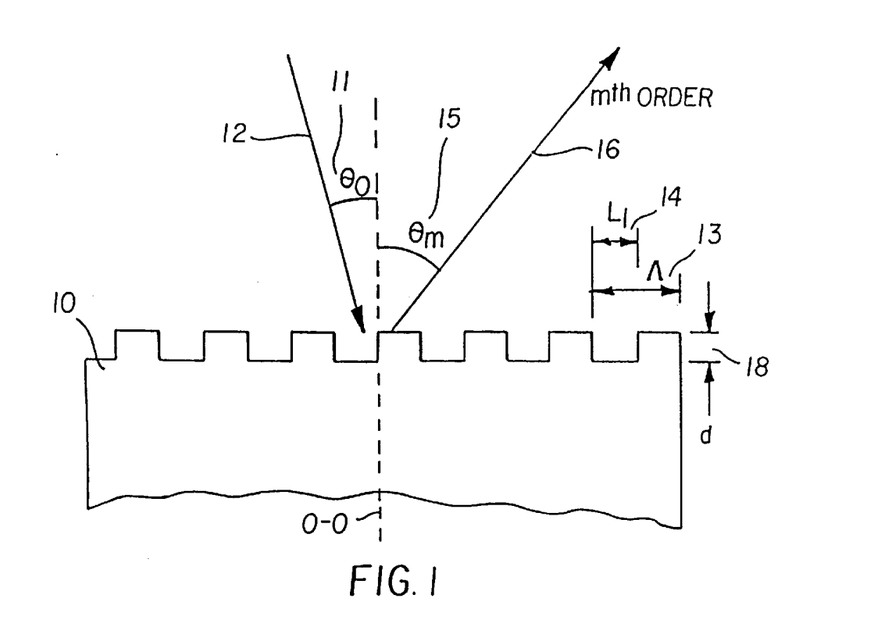
FIG. 1 is an illustration of diffraction from a binary reflective phase grating.

Periodic corrugations on optical surfaces (i.e. diffraction gratings) are well known to perturb the directionality of incident light. Collimated light incident in air upon a grating is diffracted into a number of different orders, as described by the grating equation, $$\sin \theta_m = \sin \theta_0 + \frac{m\lambda}{\Lambda}, \qquad (1)$$

were $\lambda$ is the wavelength of the light and m is an integer denoting the diffracted order. FIG. 1 illustrates a diffraction grating 10 having an optical beam 12 incident on the diffraction grating 10 at an angle $\theta_0$ 11. The reflective grating surface is defined to have a period $\Lambda$ 13, which defines the angles of diffraction according to the relation presented in Equation 1. A diffracted beam 16 corresponding to diffraction order m exits the grating 10 at an angle $\theta_m$ 15. The angle $\theta_m$ 15 is measured with respect to a perpendicular axis O—O of the diffraction grating 10. The diffraction grating 10 pictured in FIG. 1 is a binary grating where the grating profile is a square wave. The duty cycle is defined as the ratio of the width of the groove $L_1$ 14 to the grating period $\Lambda$ 13. A binary phase grating will have the maximum diffraction efficiency when the duty cycle is equal to 0.5 and R, the reflectivity, is equal to 1.0.

For uniform reflectivity and 0.5 duty cycle, the relation presented in Equation 2 is appropriate for the calculation of the theoretical diffraction efficiency, within the accuracy of scalar diffraction theory.

$$\eta_m = R\cos^2\left(\frac{\pi}{\lambda}(q_m d - m\lambda/2)\right)\frac{\sin^2(m\pi/2)}{(m\pi/2)^2}, \quad (2)$$

where $q_m$ is a geometrical factor, and m is the order of diffraction, $$q_m = \cos\theta_0 + \cos\theta_m \quad (3)$$

$$= 1 + \sqrt{1 - (m\lambda/\Lambda)^2} \text{ for normal incidence } (\theta_0 = 0).$$

For normally incident illumination, the maximum efficiency in the first (m=1) order occurs when the single-pass optical path difference d18 between beams striking the grating peak and the grating groove is equal to $\lambda/4$. Such a grating has equal diffraction efficiencies into the +1 and −1 orders of approximately 40% for the gratings of interest ($\lambda/\Lambda' \leq 0.5$), while the remaining light is diffracted into higher odd orders (i.e. ±3, ±5, etc.).

One means of increasing the efficiency is to increase the reflectivity of the ribbon surfaces by the addition of dielectric coatings on top of the metal layer.

Figure 2:
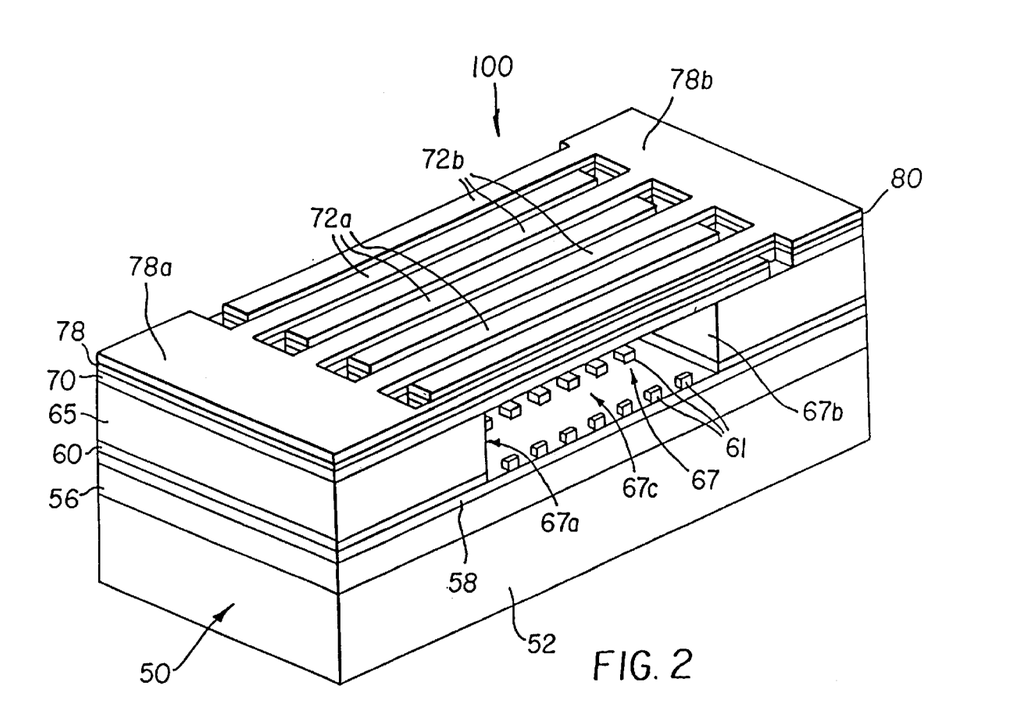
FIG. 2 is a perspective, partially cut-away view of one embodiment of the mechanical grating device of the present invention.
Figure 3:
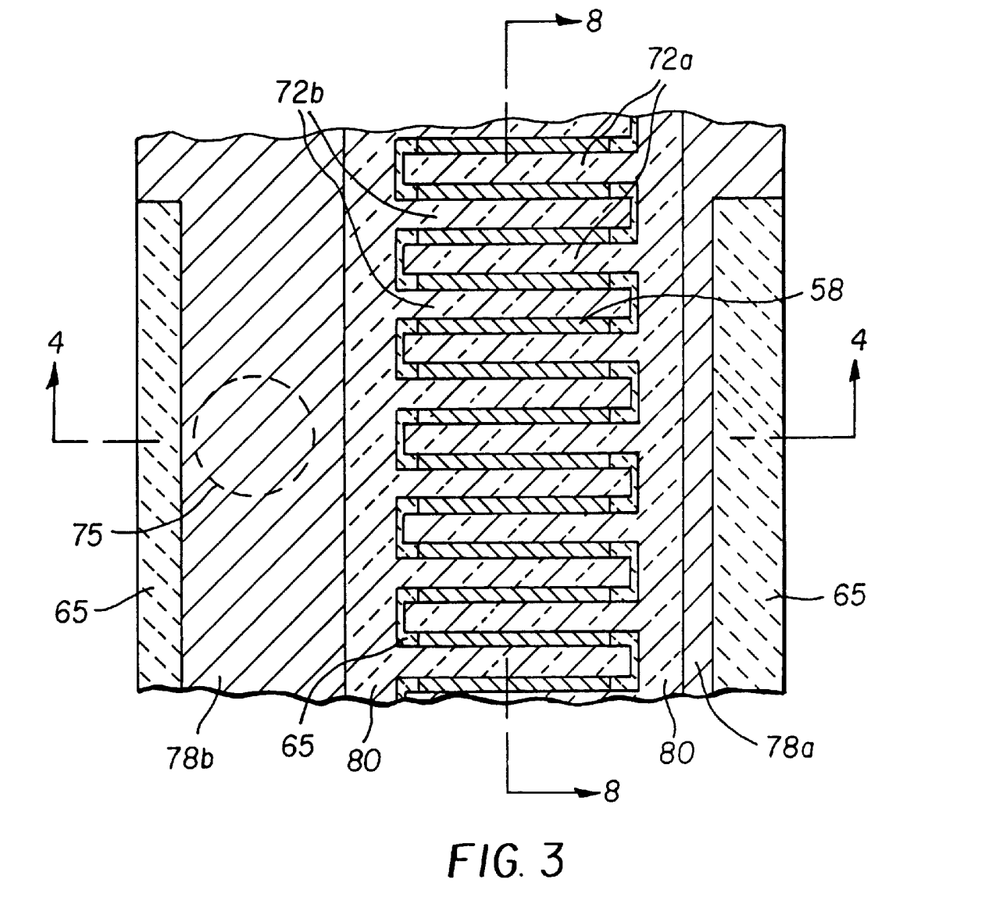
FIG. 3 is a top view of one embodiment of the mechanical grating device of the present invention.

FIG. 2 is a perspective, partially cut-away view of a mechanical grating device 100 of the present invention. Referring to FIG. 3, a top view of the mechanical grating device 100 of the present invention is shown. A first view plane 4—4, perpendicular to the length of the mechanical grating device 100 provides a cross-sectional view of the mechanical grating device 100 as shown in FIGS. 4, 5, 6 and 7. A second view plane 8—8, perpendicular to the first view plane 4—4 of the mechanical grating device 100, provides a cross-sectional view of the mechanical grating device 100 as shown in FIGS. 8, 9, 10 and 11.

The mechanically deformable structures of the mechanical grating device 100 are formed on top of a base 50. The present embodiment as shown in FIG. 2 discloses a mechanical grating device 100 operable by the application of a electrostatic force. Because the actuation force of the mechanical gating device 100 is electrostatic, the base 50 comprises several layers of different materials. The base 50 has a substrate 52 whose material is chosen from glass, plastic, metal and semiconductor materials. The substrate 52 is covered by a bottom conductive layer 56. In this embodiment the thin bottom conductive layer 56 is necessary since it acts as an electrode for applying the voltage to actuate the mechanical grating device 100. The thin bottom conductive layer 56 is covered by a protective layer 58. The bottom conductive layer 56 is selected from the group consisting of aluminum, titanium, gold, silver, tungsten, silicon alloys, and indium tinoxide. Above the protective layer 58 a standoff layer 60 is formed which is followed by a spacer layer 65. On top of the spacer layer 65, a ribbon layer 70 is formed which is covered by a reflective layer 78. The thickness and tensile stress of the ribbon layer 70 is chosen to optimize performance by influencing the electrostatic force required for actuation and the returning force, which affects the speed, resonance, frequency and voltage requirements of the electro-mechanic grating device. In the present embodiment, the reflective layer 78 has also to be conductive in order to provide electrodes for the actuation of the mechanical grating device 100. On top of the reflective layer an optical coating 80 is provided. The reflective layer 78, the ribbon layer 70 and the optical coating 80 are patterned to achieve the ribbon structure as indicated in FIG. 2 and FIG. 3.

The spacer layer 65 has a longitudinal channel 67 formed therein that comprises a first and second side wall 67a and 67b and a bottom 67c, and which is open to the top and defines a width. The bottom 67c of the channel 67 is covered by a protective layer 58. The reflective layer 78, which is conductive, is patterned to form a first and a second conductive region 78a and 78b. Both the first and the second conductive regions 78a and 78b have, according to the patterning, a comb-like structure and are arranged at the surface of the mechanical grating device 100 in an interdigitated manner. The first and second conductive region 78a and 78b are mechanically and electrically isolated from one another. The pattern of the reflective layer 78 is transferred into the ribbon layer 70 via appropriate etching methods to form a first and a second set of deformable ribbon elements 72a and 72b which are electrically and mechanically isolated form each other. The first and second sets of deformable ribbon elements 72a and 72b span the channel 67 and are secured to the surface 64a of the spacer layer 65 on either side of the channel 67. In the direction of the channel 67, the first and second sets of deformable ribbon elements 72a and 72b are arranged such that every other deformable ribbon element belongs to a different set.

In the embodiment as shown in FIG. 2, a plurality of standoffs 61 is positioned on the bottom 67c of the channel 67. The standoffs 61 are patterned from the standoff layer 60 which can be silicon nitride. In the embodiment shown here, the group of standoffs 61 is associated with the second set of deformable ribbon elements 72a. The standoffs 61 may also be patterned in the form of a single bar. The standoffs reduce ribbon failures due to stiction.

The mechanical grating device 100 as shown in FIG. 3 is a device which can be actuated by the application of an electrostatic force. The first and second, electrically conducting region 78a and 78b are formed on the surface of the mechanical grating device 100. The first and the second electrically conducting region 78a and 78b are isolated from each other to allow the application of voltage to either the first or the second set of deformable ribbon elements 72a and 72b. The first conducting region 78a applies the voltage to the first set of deformable ribbon elements 72a, and the second conducting region 78b provides the voltage to the second set of deformable ribbon elements 72b. In the embodiment shown here, the second conducting region 78b is in contact with the bottom conductive layer 56 (see FIG. 4) designated at the base 50. The thin bottom conducting layer 56 may be formed above any layer which is below the bottom 67c of the channel 67. From the view of FIG. 3, regions of the spacer layer 65 and protective layer 58 are visible because of patterning of first and second conductive region 78a and 78b to achieve electrical and mechanical isolation of the deformable ribbon elements 72a and 72b.

For operation of the mechanical grating device 100, the electrostatic force is produced by a voltage difference between the thin bottom conductive layer 56 and the first or the second conducting region 78a or 78b which are formed on top each deformable ribbon element 72a and 72b. An interconnection 75 is provided between the second conductive region 78b and the bottom conductive layer 56. It is easily understood that a conductive region can also be formed at a bottom surface 70b (see FIG. 4) of each deformable ribbon element 72a or 72b. Additionally, the conductive region can be located within each deformable ribbon element 72a and 72b. As further shown in FIG. 3, the optical coating 80 is patterned according to the form of the ribbon elements 72a and 72b and the conductive regions 78a and 78b. In this embodiment the optical coating 80 is limited to an area which is slightly wider than the width of the channel 67.

Figure 4:
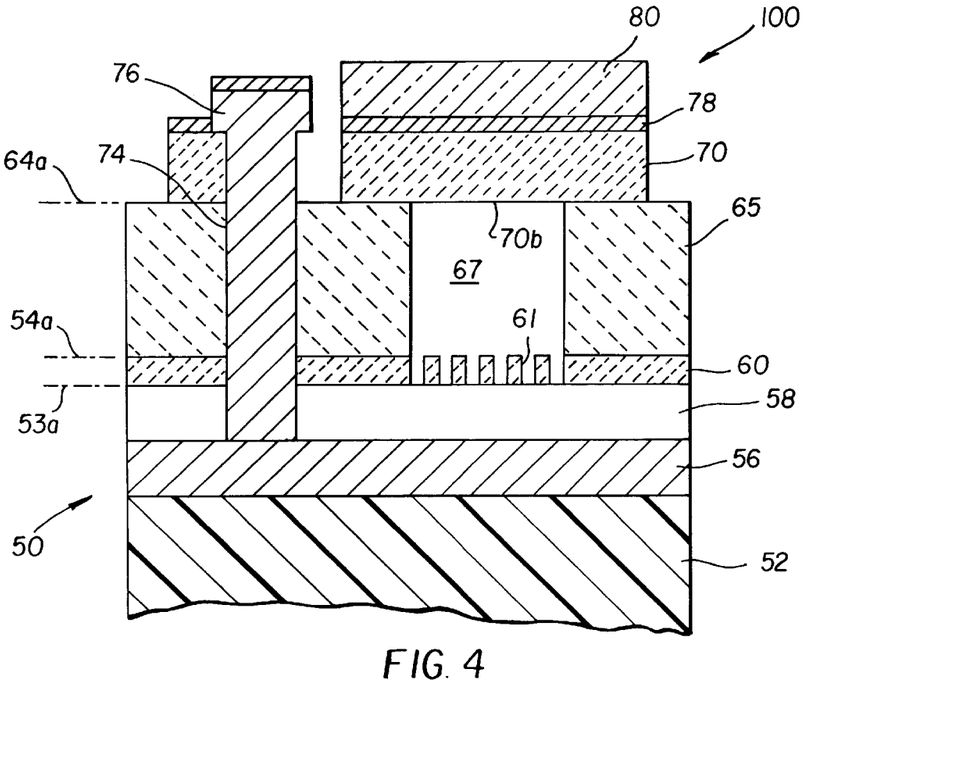
FIG. 4, one embodiment of the invention, is a cross-sectional view along plane 4—4, indicated in FIG. 3, wherein no actuation force is applied to the device.

Referring to FIG. 4, typically the base 50 comprises the substrate 52 which is a single crystal silicon wafer with an ion-implanted region as the bottom conductive layer 56 of increased conductivity. The surface 53a of the base 50 is formed by a protective layer 58 of thermal oxide. On the top surface 53a of the protective layer 58, a plurality of standoffs 61 are formed from the standoff layer 60. Each standoff 61 defines a top surface 54a which faces the bottom surface 70b of the ribbon elements 72a and 72b. The bottom surface 70b of the ribbon elements is on the same level as the top surface 64a of the spacer layer 65. The depth of the channel 67 is defined by either the distance between the bottom surface 70b of the ribbon elements 72a and 72b and the top surface 53a of the protective layer 53 (no standoffs 61 are formed on the bottom 67c of the channel 67) or between bottom surface 70b of the ribbon elements 72a and 72b and the top surface 54a of the standoffs 61. The standoffs 61 act as mechanical stops to reduce the contact area during the actuation of the ribbon elements 72a or 72b.

Figure 5:
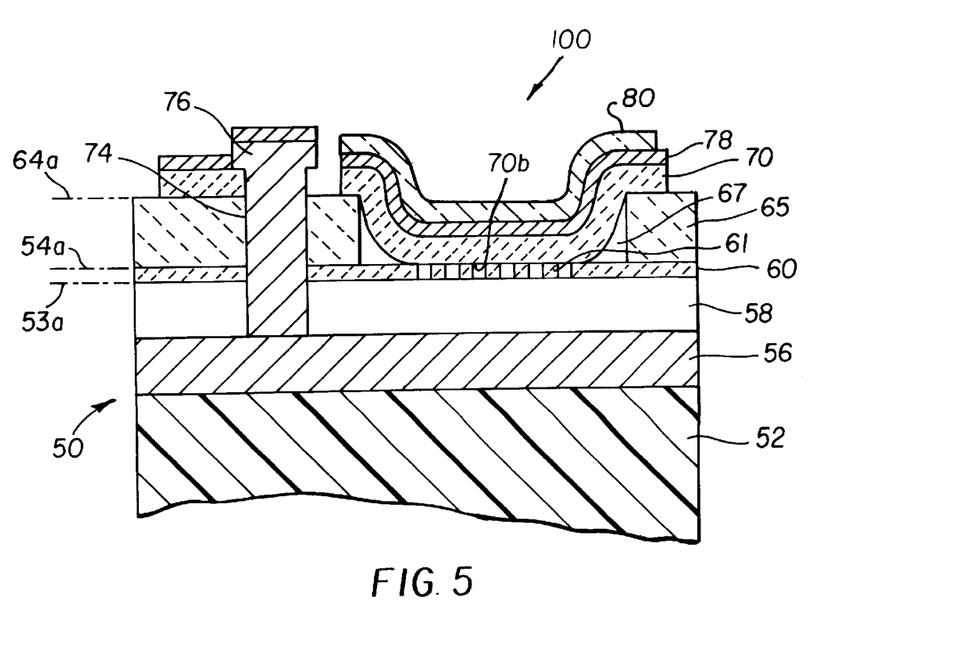
FIG. 5 is a cross-sectional view along plane 4—4, indicated in FIG. 3, wherein an actuation force is applied to the embodiment as shown in FIG. 4.
Figure 6:
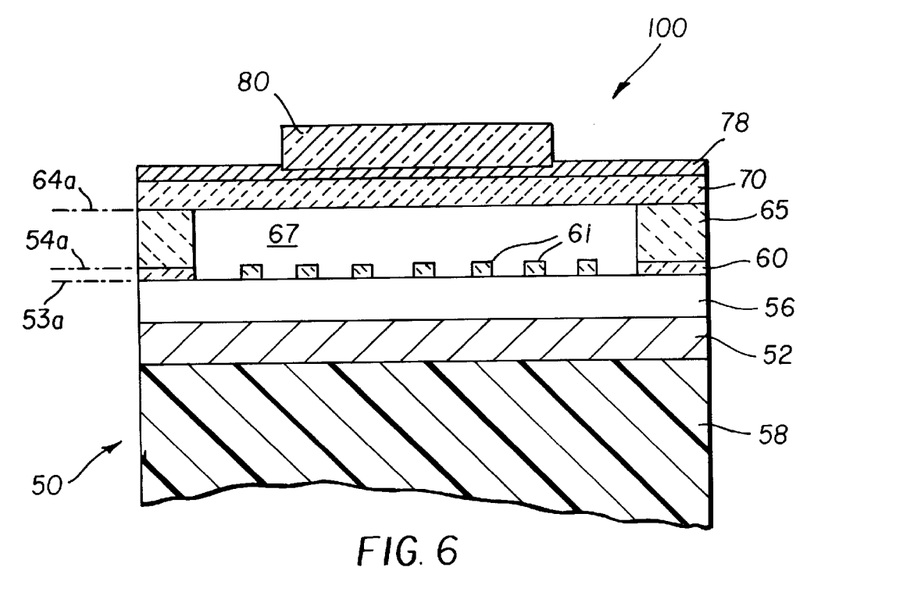
FIG. 6, another embodiment of the invention, is a cross-sectional view along plane 4—4, indicated in FIG. 3, wherein no actuation force is applied to the device.
Figure 7:
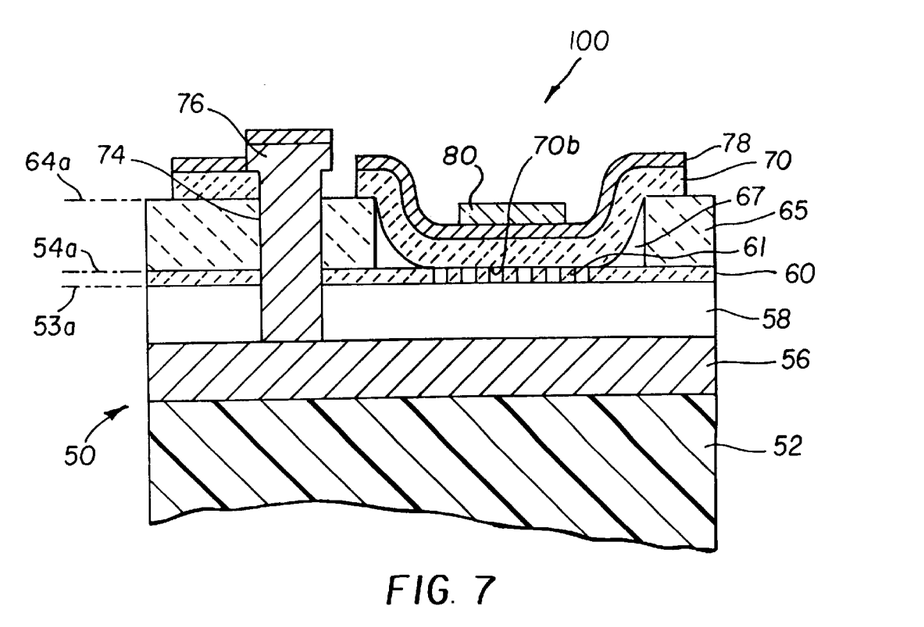
FIG. 7 is a cross-sectional view along plane 4—4, indicated in FIG. 3, wherein an actuation force is applied to the embodiment as shown in FIG. 6.

Referring now to FIGS. 5 and 7 which are cross-sectional views along plane 4—4, an electrostatic force is applied to respective ribbon elements so that the ribbon elements 72a or 72b are drawn into the channel 67 and the bottom surface 70b of the ribbon elements 72a or 72b contacts the top surface 54a of the standoffs 61. In the embodiment as shown in FIG. 5, the optical coating 80 is patterned on top of the reflective layer 78 such that side portions of the optical coating 80 extend beyond the width of the channel 67. As a result of the deformation of the ribbon elements 72a or 72b the stack of the ribbon layer 70, the conductive layer 78 and the optical coating 80 is drawn into the channel 67. Each center portion of the deformed respective ribbon element 72a and 72b contacts the top surface 54a of the standoffs 61. The region of the ribbon elements 72a and 72b which is parallel to the top surface 54a of standoffs 61 is used as the optical active region of the mechanical grating device 100.

Referring now to the embodiment as shown in FIG. 7, the optical coating 80 is patterned on top of the conductive and reflective layer 78 such that only the central part of the ribbon elements is covered by the optical coating 80. The optical coating 80 is substantially smaller than the length of the ribbon elements and the width of the channel 67. As can be seen from FIG. 6, the optical coating 80 is positioned on the ribbon elements such that the optical coating 80 is centered with respect to the width of the channel 67. As a result of the deformation of the ribbon elements 72a or 72b the stack of the ribbon layer 70, the conductive layer 78 and the optical coating 80 are drawn into the channel 67. Each center portion of the deformed respective ribbon elements 72a and 72b is in contact with the top surface 54a of the standoffs 61. The region of the ribbon elements 72a and 72b which is parallel to the top surface 54a of standoffs 61 is used as the optical active region of the mechanical grating device 100. The optical coating 80 is formed exclusively in this region and there is no deformation force exerted on the optical coating 80. In this embodiment the ribbon layer 70 and the conductive layer 78 are deformed.

For the following specification all embodiments are limited to an actuation force generated by an electrostatic means. Nevertheless, the above limitation is not regarded as a limitation of the scope of the present invention. It is easily understood by a skilled person that the generation of the actuation force is not limited exclusively to an electrostatic force.

Figure 8:
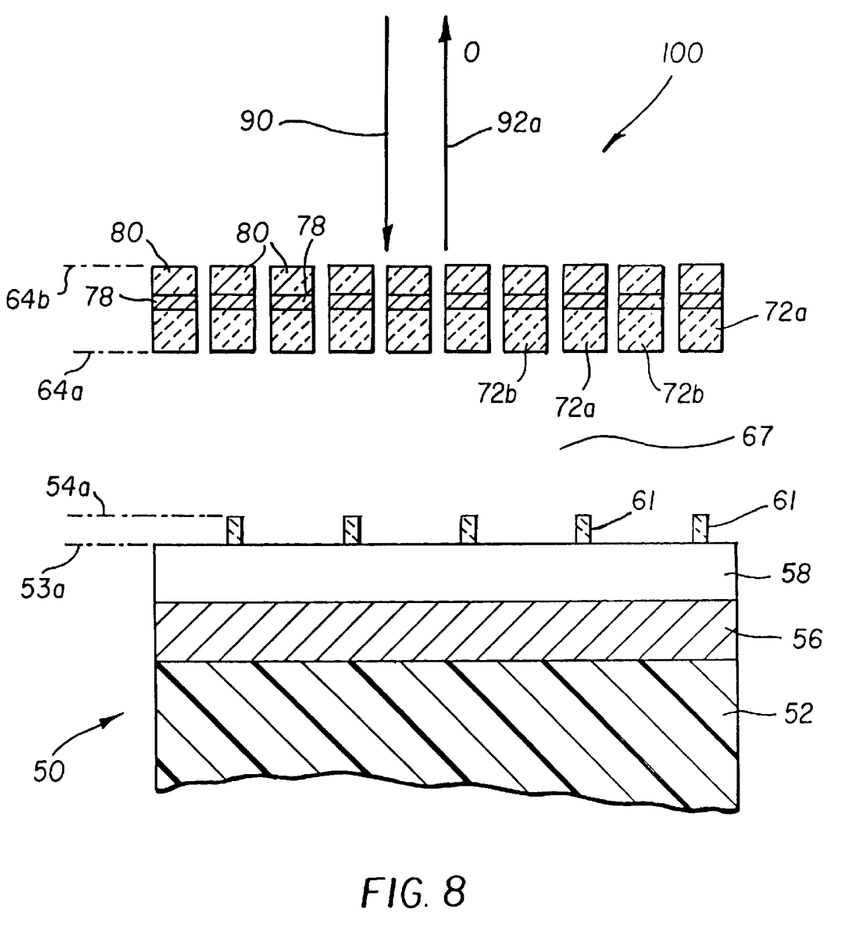
FIG. 8 is a cross-sectional view along plane 8—8 of one embodiment for the mechanical grating device with no actuation force applied to the deformable ribbon elements.

FIG. 8, a cross-sectional view along plane 8—8, illustrates the mechanical grating device 100 with no applied voltage (electrostatic force) to the first and second conductive region 78a and 78b, so that all ribbon elements 72a and 72b are coplanar. On top of the reflective and conductive layer 78 the optical coating 80 is provided. The surface of the ribbon elements 72a and 72b facing the base 50 of the mechanical grating device 100 is designated as a bottom surface 70b which is on the same level as the top surface 64a of the spacer layer 65. In the un-actuated state all ribbon elements 72a and 72b are on an equal level 64b which is defined by the optical coating 80 on top of the ribbon elements 72a and 72b. The mechanical grating device 100 acts like a mirror and an incident light beam 90 is reflected into a reflected light beam 92a, which is parallel to the incident light beam 90 in this case.

Figure 9:
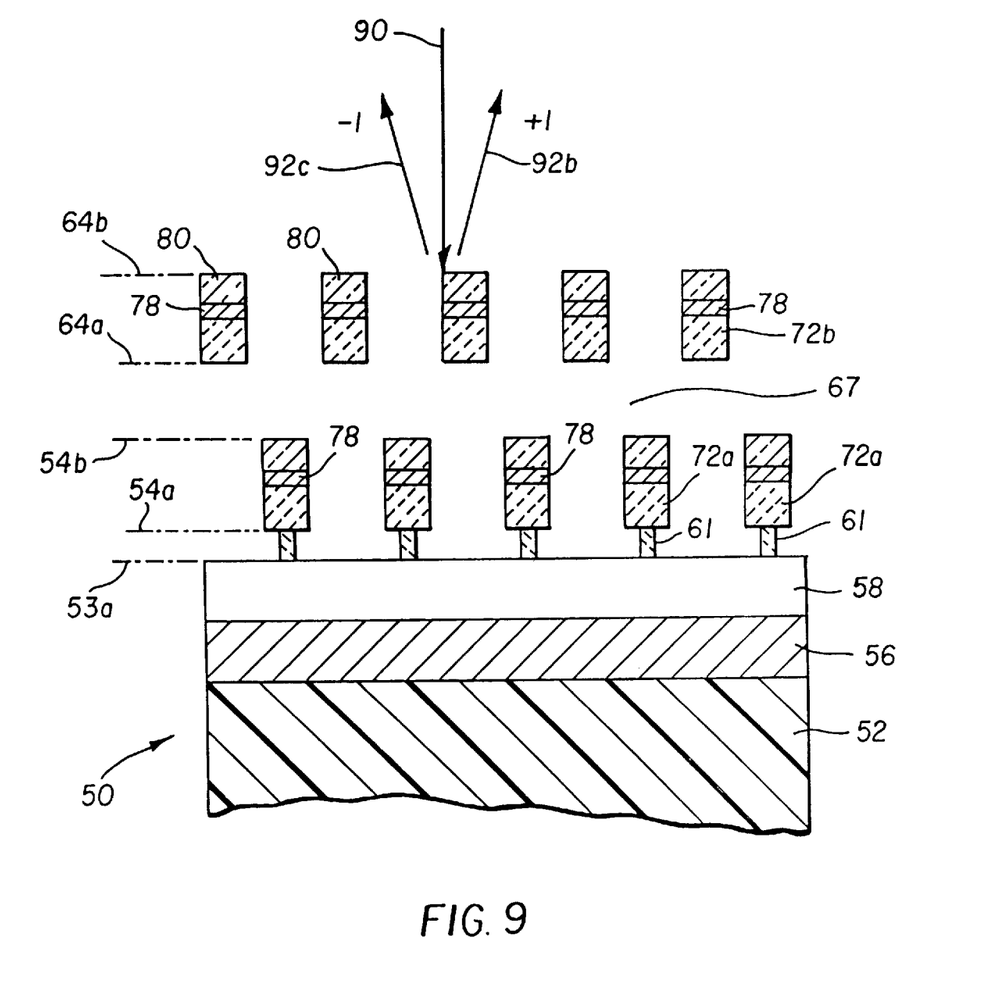
FIG. 9 is a cross-sectional view along plane 8—8 of the embodiment for the mechanical grating device of FIG. 8 with an actuation force applied to the deformable ribbon elements.

FIG. 9, a cross-sectional view along plane 8—8, illustrates the mechanical grating device 100 with an applied voltage to the first conductive region 78a in order to demonstrate the actuation of the first set of deformable ribbon elements 72a. The electrostatic force is produced by a voltage difference between the bottom conductive layer 56 and the conductive region 78a atop the ribbon layer 70. When the first set of ribbon elements 72a is actuated, the grating is formed, which diffracts the incident light beam 90 light into the +1 and −1 orders 92c and 92b, as illustrated in FIG. 9. For a sufficient voltage difference, the actuated ribbon elements make contact with the standoffs 61. The separation of the top surface 64b of the coplanar not actuated ribbon elements 72b and a top surface 54b of the actuated ribbon elements 72a is designed to maximize the efficiency of diffraction by control of the depth of the channel 67 and the heights of the standoffs 61.

The purpose of the optical coating 80 is to alter the reflective properties of the reflective and conductive layer 78, which is a metallic layer. The optical coating 80 comprises more than one dielectric layer, which is transparent in this embodiment. Likely alterations are an enhancement of the reflectivity (or reduction of absorption) at the wavelength of interest, or a shift in the phase accumulated by the reflected light. The former is useful for mechanical grating elements being subjected to high-intensity illumination. The latter can be useful in novel embodiments of GLV structures.

The mechanical grating structure places some limitations on the allowable thickness of the dielectric optical coating 80. Since the width of the ribbon elements 72a and 72b in the preferred embodiment is a few microns or less, the total thickness of the optical coating 80 must be much thinner than the width of the ribbon elements 72a and 72b. This minimizes the effect of the edges of the optical coating 80.

The effect on the mechanical characteristics of the ribbon elements 72a and 72b must also be considered in the design of GLV devices with optical coatings 80. The increased thickness will typically increase the electrostatic force required to actuate the ribbon elements 72a and 72b, because of an increase in the bending moment at the ends of the ribbon elements 72a and 72b. In theory, compensation for this effect can be realized by depositing optical films with compressive stress. However, the large stress mismatch between the ribbon material 72 and the optical coating materials 80 could result in poor adhesion or bowing of the ribbons after release.

It is important to minimize the mechanical effects by limiting the dielectric optical coating 80 to a small thickness while minimizing the stress in the optical coating material. The stress can be minimized by alternating materials with compressive and tensile stresses, as discussed by Ennos in "Stresses developed in optical film coatings," published in *Applied Optics* vol. 5 (1966). Silicon dioxide ($SiO_2$) evaporated in vacuum at room temperature can be used as a low-index material with compressive stress, and titanium dioxide ($TiO_2$) evaporated in the same way can be used as a high-index material with tensile stress.

Returning to FIG. 7, the embodiment shown reduces the effects of the optical coating 80 on the mechanical behavior of the ribbon elements 72a and 72b. The optical coating 80 is patterned to cover the central region of the ribbon elements (the central region of the ribbon elements 72a and 72b means that the deposited optical coating 80 is substantially smaller than the width of the channel 67 and centered with respect to said channel 67). Thus, the optical coating 80 will produce the desired optical effects when illuminated at the center with a line focus. It will not as significantly affect the mechanical behavior of the ribbon elements 72a and 72b, because the bending occurs at the portions of the ribbons closest to the ends (near to the edges of the channel 67), which are not covered by the optical coating 80. The only remaining effect is on the restoring force due to the alteration of the tension in the ribbon elements 72a and 72b in the region covered by the optical coating 80. In the embodiment illustrated in FIG. 6, the overall stress of the optical coating 80 should preferably be tensile or negligible. A significant compressive stress can result in adhesion problems or can cause the ribbon elements 72a and 72b to bow due to the strain mismatch between the material of the ribbon layer 70 and the material of the optical coating 80, which would degrade the performance mechanical grating device 100. Ideally, the technique of stress compensation would be used in the stack of the optical coating 80, so that its presence would have negligible effect on the electromechanical performance of the mechanical grating device 100.

EXAMPLE I

For Alternate Coating on the Ribbon Elements

Figure 10:
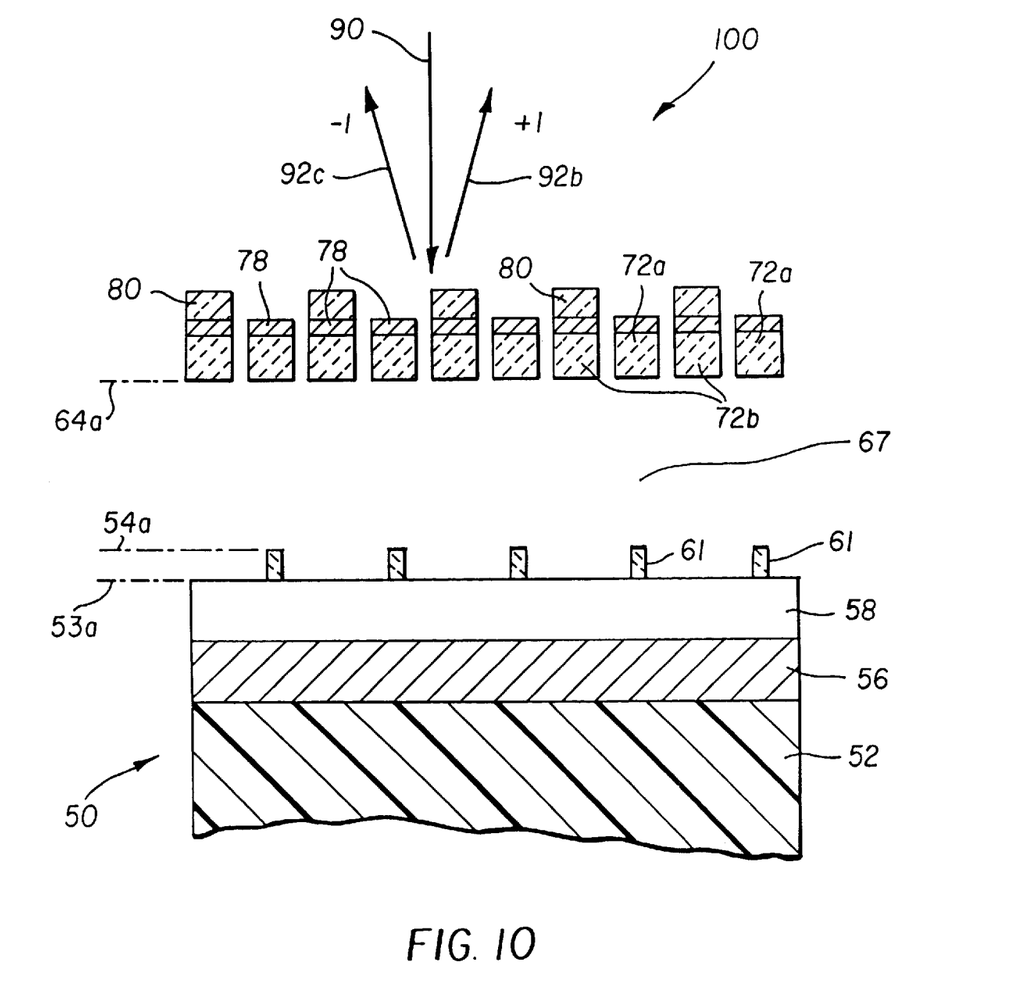
FIG. 10 is a cross-sectional view along plane 8—8 of a further embodiment for the mechanical grating device with no actuation force applied to the deformable ribbon elements.
Figure 11:
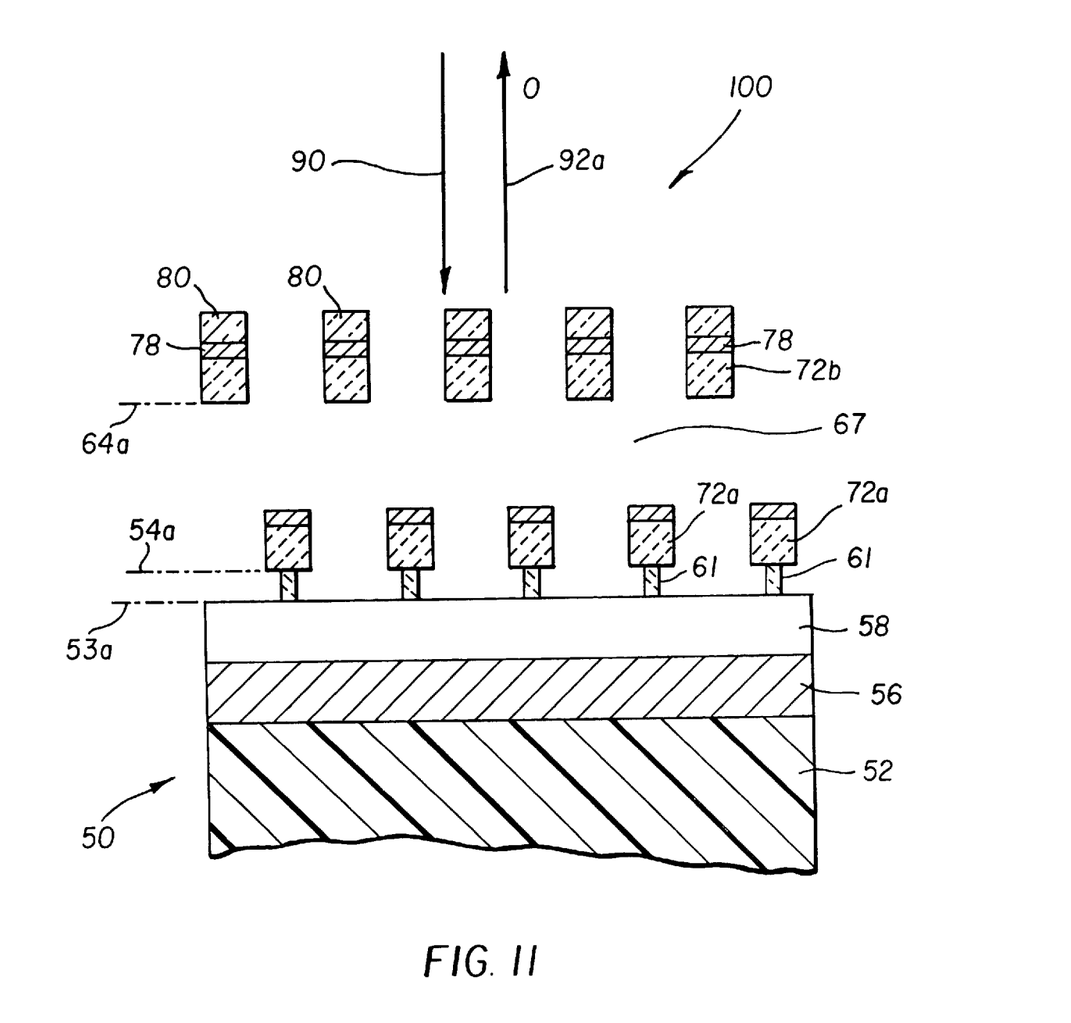
FIG. 11 is a cross-sectional view along plane 8—8 of the embodiment for the mechanical grating device of FIG. 10 with an actuation force applied to the deformable ribbon elements.

Referring now to FIGS. 10 and 11, which show an alternative embodiment for the coating of the ribbon elements 72a and 72b. By patterning and etching an optical coating 80 from alternate ribbon elements 72a or 72b, the phase shift on reflection can be varied between the ribbon elements 72a and 72b without the application of an electrostatic force (see FIG. 10). A prudent coating design for such an application will keep the absolute reflectivity unaltered between the ribbon elements 72a and 72b in order to produce a pure phase grating. Such a technique can be used, for example, to produce a GLV device with improved diffraction efficiency in the on-state.

FIGS. 10 and 11 illustrate a mechanical grating device 100 in which every other ribbon element 72b (for example the second set of ribbon elements 72b) has an optical coating 80 on top of the reflective and conductive layer 78. The optical coating 80 is designed such that the reflective layer 78 under the optical coating 80 is equal to that of the bare reflective layer 78, but the phase shift upon reflection is 180 degrees out of phase with the phase shift produced by reflection from the bare reflective layer 78. There is one embodiment where the optical coating is an additional reflective metal layer. The reflective metal layer has a thickness of $M\lambda/4$ wherein M is an odd integer less than 10. According to a second embodiment, the optical coating 80 is composed of at least one transparent dielectric layer. The optical coating 80 has a thickness which imparts a phase shift of $M\lambda/4$ wherein M is an odd integer less than 10 and the total thickness of the optical coating 80 must be much thinner than the width of the ribbon elements 72a and 72b. The optical coating 80 is removed from the first set of ribbon elements 72a. The ribbon elements 72a are movable.

An example of such an optical coating 80 for 650 nm light using aluminum as the reflective layer 78 follows. A 974.5 Å thick layer of $SiO_2$ is deposited onto the Al-layer, followed by 712.2 Å of $TiO_2$, then 651.8 Å of $SiO_2$, and finally 216.4 Å of $TiO_2$. At 650 nm, the reflectivity and phase shift on reflection for are 90.7% and 164 degrees for a bare aluminum surface. The reflectivity and phase shift on reflection for s-polarized 650 nm light from aluminum coated with the aforementioned thin film stack as the optical coating 80 are 90.7% and 344 degrees. Therefore, the relative phase shift between aluminum and this optical coating is 180 degrees as desired.

When the ribbon elements 72a and 72b are un-actuated, as shown in FIG. 10, the grating that is produced by the alternating optical coating diffracts the incident light beam 90 into non-zero orders, primarily the +1 and −1 orders 92b and 92c. Thus, none of the light is reflected in to the 0 order from the grating. When the first set of ribbon elements 72a is actuated by a distance of $\lambda/4$ as illustrated in FIG. 11, the apparent grating does not vary in reflectivity or phase upon reflection. Such a "null" grating acts nearly like a planar mirror, except for the effects of inter-ribbon gaps. The actuation distance is determined by the top level 64a of the spacer layer 65 and the top level 54a of the standoffs 61. Thus, nearly all of the incident light 90 is reflected into the 0 order 92a. If the 0 order 92a is collected, the diffraction efficiency in the "on" state can be very high, limited primarily by the diffraction from the inter-ribbon gaps and by deviations in both the actuation distance and the film thicknesses from the target values.

EXAMPLE 2

Low-stress Enhanced Reflective Layer of Aluninum for 650 nm

A dielectric optical coating 80 to enhance the reflectivity of aluminum (reflective and conductive layer 78) at 650 nm with a low residual stress and adhering to the thickness constraints discussed above is now presented. The coating design is specific to illumination at normal incidence. The necessary adjustments to the design for different angles of incidence and polarizations are well known by one skilled in the art. The optical coating 80 comprises a first coating of silicon dioxide ($SiO_2$), which when evaporated at room temperature is compressively stressed and has a low refractive index. A second coating of titanium dioxide ($TiO_2$), is evaporated onto the first coating and results in a layer which is tensile and has a high refractive index. The thickness of the $SiO_2$ layer is 982 Å, and the thickness of the $TiO_2$ layer is 695 Å.

Figure 12:
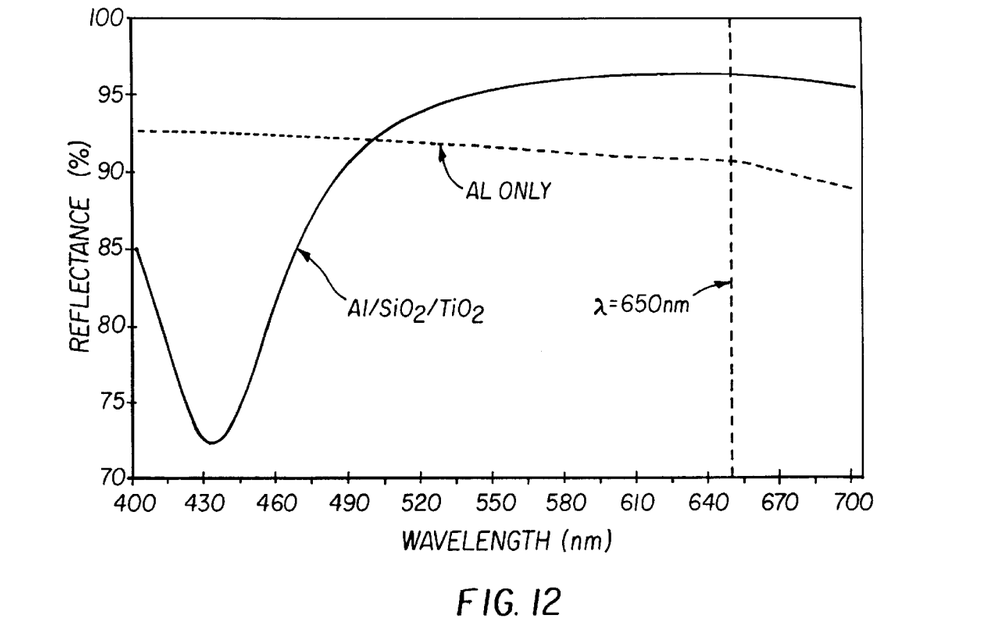
FIG. 12 is the reflectivity spectrum for Al-reflective layer enhanced by a $SiO_2/TiO_2$ dielectric layer.

A plot of the reflectivity over a wavelength range is shown in FIG. 12 which compares the reflectivity of the coated aluminum to that of bare aluminum. At the target wavelength of 650 nm, the reflectivity is improved from 90.7% to 96.3%. Because the aluminum coating is of sufficient thickness to be opaque, the surfaces and materials are assumed to be non-scattering, and the dielectrics of the optical coating 80 are non-absorbing at that wavelength, the remainder of the energy is absorbed in the aluminum coating. Thus, the absorption of the incident light by the aluminum is reduced by more than half by the addition of the optical coating 80. This would provide a substantial improvement of the damage threshold when illuminated by a high-intensity beam.

EXAMPLE 3

Tensile Enhanced Reflective Layer of Aluminum for 650 nm

Figure 13:
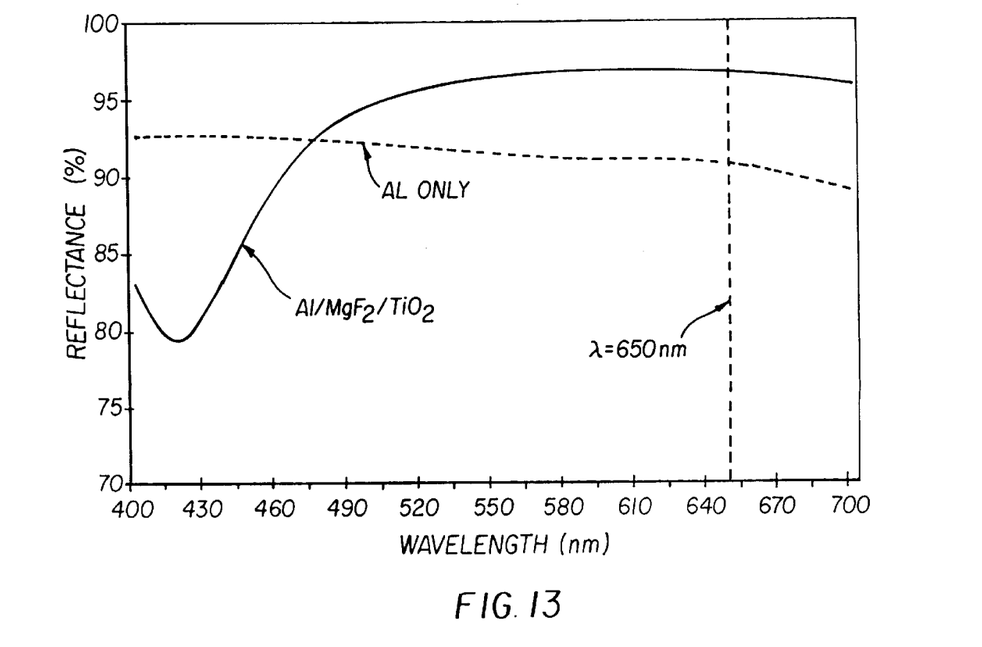
FIG. 13 is the reflectivity spectrum for Al-reflective layer enhanced by a $MgF_2/TiO_2$ dielectric layer.

A slightly better enhancement of the reflectivity of aluminum (reflective and conductive layer 78) for normally incident 650 nm light can be achieved by using $MgF_2$, which has a lower index of refraction than $SiO_2$, which it replaces in this example. In this coating design, a layer of $MgF_2$ is deposited on the reflective layer 78 of aluminum to a thickness of 1038 Å, upon which a layer of $TiO_2$ is deposited to a thickness of 695 Å. The reflectivity is displayed in FIG. 13, in which it is compared to a bare aluminum reflective layer 78. The reflectivity at the target wavelength is expected to be 96.7%, which is 0.4% higher than could be achieved with the $SiO_2/TiO_2$ coating.

The evaporation of $MgF_2$ at room temperature typically results in a tensile film. Thus, both layers of the optical coating 80 are tensile and the resulting tension in the optical coating 80 could be comparable to the tension in the ribbon layer 70. This optical coating 80 should preferably be employed on a mechanical grating device 100 with the embodiment shown in FIG. 6 in order to achieve the desired mechanical properties.

The invention has been described in detail with particular reference to certain preferred embodiments thereof, but it will be understood that variations and modifications can be effected within the spirit and scope of the invention.

PARTS LIST

| | |
|---|---|
| 10 | diffraction grating |
| 11 | incident angle $\theta_0$ |
| 12 | incident light beam |
| 13 | period $\Lambda$ of the grating |
| 14 | width of the groove $L_1$ |
| 15 | diffracted angle $\theta_m$ |
| 16 | diffracted beam |
| 18 | single-pass optical path difference d |
| 50 | base |
| 50a | top surface of base |
| 52 | substrate |
| 53a | surface of the base |
| 54a | top surface of standoffs |
| 54b | top surface of actuated ribbon elements |
| 56 | thin bottom conductive layer |
| 58 | protective layer |
| 60 | standoff layer |
| 61 | standoff |
| 64a | top surface of the spacer layer |
| 64b | level of the optical coating |
| 65 | spacer layer |
| 66 | sacrificial material filled in the channel 67 |
| 67 | channel |
| 70 | ribbon layer |
| 70b | bottom surface of the ribbon elements |
| 72a | first set of deformable ribbon elements |
| 72b | second set of deformable ribbon elements |
| 74 | opening |
| 75 | interconnection |
| 76 | thick conducting layer |
| 78 | conductive layer |

-continued

PARTS LIST

| | |
|---|---|
| 78a | first conducting region |
| 78b | second conducting region |
| 80 | optical coating |
| 90 | incident light beam |
| 92a | reflected light beam |
| 92b | diffracted beam in +1 order |
| 92c | diffracted beam in −1 order |
| 100 | mechanical grating device |
| 4—4 | first view plane |
| 8—8 | second view plane |
| O—O | axis of the diffraction grating |
| m | diffraction order |
| M | odd integer |

What is claimed is:

1. A mechanical grating device comprising:
   a base having a surface;
   a spacer layer provided above the base, said spacer layer defining an upper surface and a longitudinal channel defining a width is formed in said spacer layer;
   a plurality of spaced apart deformable ribbon elements disposed parallel to each other and spanning the width of the channel, said deformable ribbon elements defining a top and a bottom surface;
   a reflective layer added to the top surface of each of said ribbon elements; and
   an optical coating provided on top of the reflective layer of every other ribbon element.

2. The mechanical grating device as recited in claim 1 wherein the optical coating is a reflective metal layer.

3. The mechanical grating device as recited in claim 2 wherein the reflective metal layer has a thickness of $M\lambda/4$ wherein M is an odd integer less than 10 and the total thickness of the optical coating must be much thinner than the width of the ribbon elements.

4. The mechanical grating device as recited in claim 1 wherein the optical coating is composed of at least one transparent dielectric layer.

5. The mechanical grating device as recited in claim 4 wherein the optical coating has a thickness which imparts a single-pass phase shift of $M\lambda/4$ wherein M is an odd integer less than 10 and the total thickness of the optical coating must be much thinner than the width of the ribbon elements.

6. The mechanical grating device as recited in claim 1 wherein the optical coating on the ribbon elements has a length greater than the width of the channel.

7. The mechanical grating device as recited in claim 1 wherein the optical coating on the ribbon elements has a length substantially smaller than the width of the channel and is centered within the width of the channel.

8. The mechanical grating device as recited in claim 1 wherein the channel has a first and second opposing side wall and a bottom, said side walls are substantially vertically disposed with respect to the bottom, and said channel has a constant cross section along the entire length of the mechanical grating device.

9. The mechanical grating device as recited in claim 1 wherein the reflective layer is conductive.

10. A mechanical grating device comprising:
    a base having a surface;
    a spacer layer provided above the base, said spacer layer defining an upper surface and a longitudinal channel defining a width is formed in said spacer layer;
    a plurality of spaced apart deformable ribbon elements disposed parallel to each other and spanning the width of the channel, said deformable ribbon elements defining a top and a bottom surface;

a reflective layer added to the top surface of each of said ribbon elements; and an optical coating provided on top of the reflective layer of every ribbon element wherein the optical coating is formed as a stack of more than one transparent dielectric layers.

11. The mechanical grating device as recited in claim 10 wherein the optical coating has a thickness which increases the reflectivity and the total thickness of the dielectric optical coating must be much thinner than the width of the ribbon elements.

12. The mechanical grating device as recited in claim 10 wherein the optical coating on the ribbon elements has a length greater than the width of the channel.

13. The mechanical grating device as recited in claim 10 wherein the optical coating on the ribbon elements has a length substantially smaller than the width of the channel and is centered within the width of the channel.

14. The mechanical grating device as recited in claim 10 wherein the channel has a first and second opposing side wall and a bottom, said side walls are substantially vertically disposed with respect to the bottom, and said channel has a constant cross section along the entire length of the mechanical grating device.

15. The mechanical grating device as recited in claim 10 wherein the reflective layer is conductive.

16. A method for manufacturing a mechanical grating device comprising the steps of:

providing a spacer layer on top of a protective layer which covers a substrate;

etching a channel entirely through the spacer layer;

depositing a sacrificial layer at least as thick as the spacer layer, wherein the spacer layer is of a different material from the sacrificial layer;

rendering the deposited sacrificial layer optically coplanar by chemical mechanical polishing;

providing a tensile ribbon layer completely covering the area of the channel;

providing a reflective layer; providing an optical coating;

patterning the optical coating, the reflective layer, and the ribbon layer in the form of a grating; and removing entirely the sacrificial layer from the channel.

17. The method for manufacturing a mechanical grating device according to claim 16 comprising the additional step of patterning the optical coating so as to remove it from every other ribbon element.

18. The method for manufacturing a mechanical grating device according to claim 16 comprising the additional step of limiting the optical coating to a width which is at least of the same size as the width of the channel.

19. The method for manufacturing a mechanical grating device according to claim 18 wherein the limiting step results in a width of the optical coating which is substantially smaller than the width of the channel and centered within the width of the channel.

20. The method for manufacturing a mechanical grating device according to claim 16 wherein the patterning of the optical coating, reflective layer, and ribbon layer results in a first and a second set of deformable ribbon elements which are mechanically and electrically isolated from each other.

21. The method for manufacturing a mechanical grating device according to claim 16 comprising the step of providing a plurality of standoffs in the channel.

22. The method for manufacturing a mechanical grating device according to claim 16 comprising the steps of forming at least one electrical conductive interconnect in the spacer layer thereby connecting the conductive layer and the substrate.

23. The method for manufacturing a mechanical grating device according to claim 16 comprising the step of providing a bottom conductive layer on top of the substrate.

* * * * *